United States Patent Office 3,458,804
Patented July 29, 1969

3,458,804
PROCESS FOR THE PRODUCTION OF PIGMENT COMPOSITION
Karlheinz Wolf, Cologne-Stammheim, and Arthur Haus and Theodor Mager, Leverkusen, and Reinhold Hörnle, Cologne-Flittard, and Franz Bechlars, Leverkusen, Germany, assignors to Farbenfabriken Bayer Aktiengesellschaft, Leverkusen, Germany, a corporation of Germany
No Drawing. Filed Apr. 11, 1966, Ser. No. 541,524
Claims priority, application Germany, Apr. 21, 1965,
F 45,865
Int. Cl. C09c 3/02
U.S. Cl. 106—308                                    11 Claims

ABSTRACT OF THE DISCLOSURE

Pigment compositions comprising an intimate mixture of 50.60% by weight of a pigment dye, 10–15% by weight of a nonionic ethylene oxide-based dispersing agent, 25–40% by weight of a synthetic or natural resin having a softening point above 120° C., and 0.1–2% by weight of an antioxidant. A process for the preparation of the above pigment composition which comprises kneading a mixture consisting of a pigment dye, a resin, a nonionic ethylene oxide-based dispersing agent, and an antioxidant at temperatures of 70°–150° C., cooling the mixture, and grinding the resulting composition into a granular product. The pigment composition of this invention is useful in coloring or tinting paints or other coating compositions.

---

This invention relates to a pigment composition containing a pigment dye and a synthetic or natural resin and to a process of preparing this pigment composition.

As is well known, pigment colors must be present in a finely divided form in organic media, especially in the case of printing dyes and lacquers. The size of the pigment particles can be reduced by incorporating the pigments directly into the binder by means of suitable trituration assemblies, e.g. hopper mills, ball mills or roller mills. This trituration of the pigments takes up a great deal of time and energy in the lacquer and printing dye industry. Pigment preparations with which it is possible to obtain finely divided pigment suspensions without additional triturating or mechanical distintegrating operations are therefore of great practical advantage.

It has already been proposed to employ mechanical energy to achieve fine subdivision of pigments in an organic medium, e.g. in viscous solutions of resins in plasticizer or oils, in the presence of grinding agents which subsequently have to be washed out. Although this facilitates the incorporation of the resulting pigment preparations in printing dyes, lacquers and other organic media, the operation of washing out the grinding agents after the manufacturing process is difficult and very complicated.

The object of this invention is an improved pigment composition consisting of an intimate mixture of a pigment dye, a non-ionic ethylene oxide-based dispersing agent, a synthetic or natural resin having a softening point of above 120° C. and an antioxidant.

According to the present invention a pulverulent, nonsticky pigment composition of soft grain and excellent distribution in organic media, especially in printing dyes and lacquers, is prepared even without additional disintegrating or triturating operations by kneading a mixture consisting of pigment dye, a synthetic or natural resin and a non-ionic dispersing agent based on ethylene oxide at elevated temperature, cooling these mixtures and subsequently grinding up the granular product obtained. The mechanical treatment is preferably carried out in a heatable kneading apparatus, for example a dispersion kneader, which has a driving power of 20 to 90 H.P. for 200 liters of useful volume, and the operation should be carried out at a temperature sufficiently high to produce a viscous, kneadable composition having a viscosity above 100,000 cps. In these pigment preparations, the addition of dispersing agent considerably improves the distribution and fine subdivision of the pigments in organic media and at the same time lowers the melting point of these preparations to such an extent that the kneading operations can be carried out at temperatures as low as 70 to 150° C. In the case of pigments unstable to temperature, higher kneading temperatures would lead to changes in color tone accompanied by reduction in the intensity of the color. The dispersing agent remains in the pigment preparation and functions as plasticiser in the lacquer and in the film of printing dye, so that the amount of usual plasticiser added (e.g. esters of phosphoric and phthalic acid) can be reduced accordingly.

It is advantageous if the pigment preparations contain an antioxidant such as 2,2′-methylene-bis(4-methyl-6-tertiary butyl-phenol). This prevents reduction in solubility which might otherwise occur due to oxidation of the resin in these preparations.

The dispersing agents used are ethylene oxide addition products containing 30 to 50 mols of ethylene oxide, e.g. the products of addition of ethylene oxide to alkyl alcohols, alkyl phenols or carboxylic acids (see Schonfeldt, Oberflachenaktive Anlagerungsprodukte des Athylenoxids, pages 18 to 57 (1959)). Suitable resins are natural and synthetic condensation resins having a softening point above 120° C., resins containing a substantial proportion of colophony, hydrogenated colophonium resins, oil-free alkyl resins, maleate resins, ketone resins, phenol resins, chlorinated rubber resins, cellulose esters and ethers and other natural or synthetic resins customarily used in the lacquer and printing dye industry (see Karsten, Lackrohstofftabellen, publishers R. Vincents, Hanover, (1963)) as well as condensation products prepared by reacting aromatic hydroxysulphones with formaldehyde and aromatic hydroxycarboxylic acids or aryl hydroxy fatty acids or their esters with the addition of phenol (German Auslegeschrift 1,124,959) and mixtures of these condensation products in resins.

However, the properties and quantities of resin and dispersing agent have to be so adjusted with relation to each other that high shearing forces are produced at 70 to 150° C. during the kneading process to ensure maximum fineness of the pigment particles in the pigment preparation and to ensure that a non-sticky product which can be ground is obtained at the end of the kneading process.

The following dye components can be used: organic pigments, e.g. pigment dyes of the azo series, dye lacquers (see Ullmann's Encyklopadie der Technischen Chemie, vol. 13, pages 806 and 808 (1962)); complex pigment dyes (see Ullmann's Encyklopadie der Technischen Chemie, vol. 13, page 809); anthraquinone dyes (see Ullmann's Encyklopadie der Technischen Chemie, vol. 3, page 696 (1953)); and quinacridone pigments, inorganic pigments, e.g. titanium dioxide, iron-, cadmium-, chromium- and zinc pigments and carbon black.

The pigment composition contains 30 to 80% by weight, preferably 40 to 60% by weight, of a pigment dye, 70 to 30% by weight and preferably 40 to 25% by weight of a resin, 3 to 20% by weight and preferably 10 to 15% by weight of an ethylene oxide addition product and 0.1 to 2% by weight based on the whole mixture of an antioxidant.

By the new process, pigment preparations are obtained which can be distributed very rapidly by simply stirring them with stirring mechanisms or by hand into organic media such as those used for the preparation of printing and lacquer dyes, e.g. those based on mono- or polyhydric and lower or higher alcohols, esters, ketones and benzene hydrocarbons, and yield an extremely finely divided pigment suspension. Apart from the fact that they can be more readily and more finely dispersed than the usual pigments, these pigment preparations have the advantage that they are distinctly more transparent and clear in print and in lacquers and moreover have much better flow properties than the usual powder pigments.

The following examples illustrate more particularly the invention. The parts and percentages given in the examples are parts by weight and percentages by weight:

Example 1

39.8 parts of a maleate resin of melting point 150° C. and acid number 310 to 320 are disintegrated in a heatable dispersion kneader of the Werner and Pfleiderer type at a temperature of 80 to 100° C. Then, with continuous kneading of the resin, there are added 45 parts of the yellow pigment dye (Yellow 83, Colour Index Supplement 1963, page 530), 8 parts of an ethylene oxide addition product prepared from 6 mols of ethylene oxide and 1 mol of nonyl phenol, 7 parts of an ethylene oxide addition product prepared from 4 mols of ethylene oxide and 1 mol of nonyl phenol, and 0.2 parts of 2,2'-methylene-bis(4-methyl-6-tertiary butyl-phenol).

A viscous, kneadable composition is obtained which is kneaded for 2 to 3 hours at a temperature of 80 to 100° C. (to maintain this temperature, it may be necessary to cool slightly owing to the heat liberated by kneading). The pigment preparation obtained is cooled to room temperature and ground. A pulverulent, non-sticky product is obtained which is mainly suitable for incorporating in any flexo- or deep-printing dyes and lacquers the binding agents of which are compatible with the resins used in the formation of the pigment and which contains solvents selected from among alcohols, esters, ketones and benzene hydrocarbons. The pigment composition obtained can easily be incorporated in such solutions by stirring for about ½ hour with a high speed stirrer. A highly pigmented printing dye can be prepared, for example according to the following prescription:

35–60 parts of the pigment preparation are stirred into 70 parts of spirits and 7 parts of ethyl glycol. This mixture is stirred for about ¼ hour and treated with a solution prepared from 14 parts of nitrocellulose (soluble in spirits, 35% butanol moist), 5 parts of a ketone resin, 66 parts of spirits and 3 parts of ethyl glycol.

Example 2

A pigment preparation consisting of:

55% of the yellow pigment dye of Colour Index (second edition) No. 21100
26.9% of a condensation resin of formaldehyde, 4,4'-dihydroxyphenylsulphone, salicylic acid and o-hydroxydiphenyl prepared according to Example 1 of DAS 1,124,959
10% of an ethylene oxide addition product prepared from 6 mols of ethylene oxide and 1 mol of nonyl phenol
8% of an ethylene oxide addition product prepared from 4 mols of ethylene oxide and 1 mol of nonyl phenol, and
0.1% of 2,2'-methylene-bis(4-methyl-6-tertiary-butyl-phenol)

is prepared as described in Example 1. A product is obtained which can be used for the purposes mentioned in Example 1.

Example 3

A pigment consisting of:

45% copper phthalocyanine of the β-modification
41.8% of a maleate resin of melting point 150° C.
7% of an ethylene oxide addition product prepared from 7 mols of ethylene oxide and 1 mol of nonyl phenol
6% of an ethylene oxide addition product prepared from 10 mols of ethylene oxide and 1 mol of nonyl phenol, and
0.2% of an antioxidant is prepared as described in Example 1 and employed for the purposes mentioned therein.

Example 4

A pigment preparation consisting of:

30% of carbon black as used for dyes
54.8% of a maleate resin of melting point 150° C. according to Example 1
8% of an ethylene oxide addition product prepared from 7 mols of ethylene oxide and 1 mol of nonyl phenol
7% of an ethylene oxide addition product prepared from 10 mols of ethylene oxide and 1 mol of nonyl phenol, and
0.2% of an antioxidant is prepared as in Example 1 and used according to the purposes mentioned therein.

Example 5

A pigment preparation consisting of:

65% of titanium dioxide (rutile or anatase)
25.9% of a maleate resin of melting point 150° C. according to Example 1
5% of an ethylene oxide addition product prepared from 6 mols of ethylene oxide and 1 mol of nonyl phenol
4% of an ethylene oxide addition product prepared from 4 mols of ethylene oxide and 1 mol of nonyl phenol, and
0.1% of an antioxidant is prepared as described in Example 1 and used for the purposes mentioned therein.

Example 6

A pigment preparation consisting of:

45% of the red pigment dye of Colour Index (2nd edition) No. 12370
39.8% of a maleate resin of melting point 150° C.
15% of an ethylene oxide addition product prepared from 30 mols of ethylene oxide and 1 mol of nonyl phenol, and
0.2% of an antioxidant is prepared as described in Example 1 and used according to the possible applications mentioned there.

Example 7

A pigment preparation consisting of:

45% of the red pigment dye of Colour Index (second edition) No. 12370
39.8% of chlorinated rubber
8% of an ethylene oxide addition product prepared from 6 mols of ethylene oxide and 1 mol of nonyl phenol
7% of an ethylene oxide addition product prepared from 4 mols of ethylene oxide and 1 mol of nonyl phenol, and
0.2% of an antioxidant is prepared as described in Example 1 and may be used in toluene deep printing and in lacquers.

Example 8

A pigment preparation consisting of:

45% of the red pigment dye of Colour Index (second edition) No. 12370
39.8% of cellulose acetobutyrate
8% of an ethylene oxide addition product prepared from 6 mols of ethylene oxide and 1 mol of nonyl phenol
7% of an ethylene oxide addition product prepared from 4 mols of ethylene oxide and 1 mol of nonyl phenol, and
0.2% of an antioxidant is prepared as in Example 1 and can be worked up according to the following recipe for the preparation of a printing dye:

35 parts of the pigment preparation are stirred for 15 to 20 minutes with a mixture of 60 parts of ethyl acetate and 10 parts of methyl glycol acetate. A finely divided pigment suspension is obtained which is treated with a solution of 6 parts of cellulose acetobutyrate in 15 parts of methyl glycol acetate and 74 parts of ethyl acetate.

Example 9

A mixture consisting of:

45% of a red pigment dye (Colour Index, second edition, No. 12370) and
41.9% of a resin mixture which consists of 31.9 parts of a maleate resin of melting point 150° C. according to Example 1 and 10 parts of ethyl cellulose, and of
7% of an addition product prepared from 7 mols of ethylene oxide and 1 mol of nonyl phenol
6% of an addition product prepared from 10 mols of ethylene oxide and 1 mol of nonyl phenol, and
0.1% of 2,2'-methylene-bis-(4 - methyl - 6 - tertiary butyl phenol)

is kneaded for 2–3 hours at 100 to 140° C. according to Example 1.

Example 10

A pigment preparation consisting of 45 parts by weight of the yellow pigment of Colour Index (Supplement 1963) No. 21,105, 10 parts by weight of ethyl cellulose and 13 parts by weight of an ethylene oxide addition product prepared by condensation of p-oxydiphenyl with benzyl chloride and subsequent addition of 10 mols of ethylene oxide, were mixed in a heatable dispersion kneader under addition of 100 parts by weight of water. After 15 to 30 min. the temperature is raised to 100–120° C., 31.8 parts by weight of a maleate resin having a melting point of 150° C. and 0.2 parts by weight of 2,2'-methylene-bis(4-methyl-6-tert. butylphenole) are added. A viscous, kneadable composition is obtained which is kneaded for 3 hours at temperatures of between 100 to 120° C. The resulting pigment preparation is cooled and ground. The obtained product can be used for the purposes and applications mentioned in Example 1.

What we claim is:

1. A pigment composition consisting of an intimate mixture of 40 to 60% by weight of a pigment dye, 10 to 15% by weight of a nonionic ethylene oxide-based dispersing agent, 25 to 40% by weight of a resin having a softening point above 120° C. and selected from the group consisting of synthetic resin and natural resin, and 0.1 to 2% by weight of the entire mixture of an antioxidant.

2. The pigment composition of claim 1, wherein said non-ionic ethylene oxide-based dispersing agent is an ethylene oxide addition product from ethylene oxide and nonyl phenol.

3. The pigment of claim 1, wherein said resin is a maleate resin having a melting point of 150° C.

4. The pigment of claim 1, wherein said antioxidant is 2,2'-methylene-bis(4-methyl-6-tertiary butyl-phenol).

5. A process for the production of pigment compositions readily dispersible in organic media which comprises kneading a mixture consisting of 40 to 60% by weight of a pigment dye, 25 to 40% by weight of a resin having a softening point above 120° C. and selected from the group consisting of synthetic resin and natural resin, 10 to 15% by weight of a nonionic ethylene oxide-based dispersing agent, and 0.1 to 2% by weight of an antioxidant, at temperatures from 70° to 150° C., cooling said mixture and grinding the resulting granular product.

6. The process of claim 5, wherein said non-ionic dispersing agents is an ethylene oxide addition products having 3 to 50 mols of ethylene oxide.

7. The process of claim 5, wherein said synthetic resin is a maleate resin having a melting point of 150° C.

8. The process of claim 5, wherein said synthetic resin is a condensation resin of formaldehyde, 4,4'-dihydroxy-diphenyl sulphone, salicylic acid and o-hydroxy-diphenyl.

9. The process of claim 5, wherein said synthetic resin is a chlorinated rubber.

10. The process of claim 5, wherein said synthetic resin is cellulose acetobutyrate.

11. The process of claim 5, wherein said antioxidant is 2,2'-methylene-bis-(4-methyl-6-tertiary butyl phenol).

References Cited

UNITED STATES PATENTS 2,613,158  10/1952  Walton et al. _____ 106—308

JAMES E. POER, Primary Examiner

U.S. Cl. X.R.

106—204, 241, 309; 260—37, 38, 40, 737